(12) United States Patent
Xu

(10) Patent No.: US 12,464,061 B2
(45) Date of Patent: Nov. 4, 2025

(54) DISPLAY DEVICE AND MOBILE TERMINAL

(71) Applicant: Shenzhen China Star Optoelectronics Semiconductor Display Technology Co., Ltd., Guangdong (CN)

(72) Inventor: Haitao Xu, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 288 days.

(21) Appl. No.: 18/050,824

(22) Filed: Oct. 28, 2022

(65) Prior Publication Data

US 2024/0064219 A1 Feb. 22, 2024

(30) Foreign Application Priority Data

Aug. 22, 2022 (CN) .......................... 202211004696.6

(51) Int. Cl.
*G06F 1/16* (2006.01)
*H04M 1/02* (2006.01)
*H05K 5/00* (2025.01)
*H05K 7/00* (2006.01)

(52) U.S. Cl.
CPC ........ *H04M 1/0268* (2013.01); *G06F 1/1656* (2013.01); *G06F 1/1681* (2013.01)

(58) Field of Classification Search
CPC ............. H04M 1/0268; H04M 1/0269; H04M 1/0266; H04M 1/026; G06F 1/1652; G06F 1/1681; G06F 1/1656; G06F 1/1675; G06F 1/1637; G06F 1/1633; G09F 9/301
See application file for complete search history.

(56) References Cited

U.S. PATENT DOCUMENTS

| 10,890,947 | B2 * | 1/2021 | Choi | G09F 9/301 |
| 11,099,608 | B2 * | 8/2021 | Kim  | G06F 1/1652 |
| 11,127,323 | B2 * | 9/2021 | Kim  | G06F 1/1652 |

(Continued)

FOREIGN PATENT DOCUMENTS

CN 114582242 A 6/2022

OTHER PUBLICATIONS

Chinese Office Action issued in corresponding Chinese Patent Application No. 202211004696.6 dated May 24, 2023, pp. 1-8.

*Primary Examiner* — Anthony M Haughton

(57) ABSTRACT

A display device and a mobile terminal are provided in the present application. The display device includes a display screen, a reel, a lifting assembly, and a control circuit board. The display screen includes a first terminal and a second terminal which are disposed oppositely, wherein a display surface is connected between the first terminal and the second terminal. A reel is connected to the first terminal of the display screen. A lifting assembly is connected to the second terminal of the display screen. The lifting assembly is positioned on a side of the display screen away from the display surface, wherein the lifting assembly and the reel are configured to synchronously control the display screen to be expanded or to be rolled-up. The control circuit board is electrically connected to the display screen, wherein the control circuit board is positioned in the lifting assembly.

16 Claims, 4 Drawing Sheets

(56) References Cited

U.S. PATENT DOCUMENTS

| | | | |
|---|---|---|---|
| 11,755,066 B2* | 9/2023 | Chang | G09F 9/301 |
| | | | 361/679.01 |
| 11,880,240 B2* | 1/2024 | Pyo | H04M 1/0268 |
| 12,108,549 B2* | 10/2024 | Park | G06F 1/1652 |
| 12,203,588 B2* | 1/2025 | Park | F16M 11/18 |
| 12,249,259 B2* | 3/2025 | Kim | G09F 9/301 |
| 2015/0331448 A1* | 11/2015 | Truong | H05K 5/0226 |
| | | | 455/575.8 |
| 2017/0103735 A1 | 4/2017 | Oh | |
| 2017/0373269 A1* | 12/2017 | Seo | H10K 77/111 |
| 2018/0160554 A1* | 6/2018 | Kang | G09F 9/301 |
| 2019/0037716 A1* | 1/2019 | Kim | H05K 5/0017 |
| 2019/0098774 A1* | 3/2019 | Park | H05K 5/0217 |
| 2020/0201394 A1* | 6/2020 | Choi | G09F 9/301 |
| 2021/0090476 A1* | 3/2021 | Kang | G09F 9/301 |
| 2021/0352809 A1* | 11/2021 | Kim | H05K 5/0217 |
| 2022/0078934 A1* | 3/2022 | Lee | G09F 9/301 |
| 2022/0132679 A1* | 4/2022 | Han | H05K 5/0017 |
| 2023/0345652 A1* | 10/2023 | Sakamoto | H05B 33/02 |

* cited by examiner

DISPLAY DEVICE AND MOBILE TERMINAL

This application claims the benefit of and priority to Chinese Application No. 202211004696.6, filed Aug. 22, 2022, the entirety of which is hereby incorporated herein by reference.

FIELD OF INVENTION

The present application relates to a field of display technology, and in particular, to a display device and a mobile terminal.

BACKGROUND OF INVENTION

Intelligent terminal devices such as smart phones, e-readers, and tablet computers have been developing towards larger display regions. That is, developing of the Intelligent terminal devices towards fields of larger display screens, thinner, lighter, and more portable. With a wide application of borderless technology, a screen ratio of current Intelligent terminal devices, especially mobile phones, is approaching the limit. As a result, a larger carrying volume is required to have a larger screen. Therefore, as a solution that can provide a larger display screen and a smaller carrying volume, the emergence and application of foldable display screens and rollable display screens are inevitable results of market demand.

Compared with a folding method of a display screen of intelligent terminal equipment, a method of curling and retracting the display screen is more promising. The method of curling and retracting the display screen can have a large display region when the screen is expanded and has a smallest carrying volume after the screen is rolled up. At the same time, the technology of a rollable display screen of organic light-emitting diode (OLED) has gradually matured, thereby having a roll-type rollable screen is possible for intelligent terminal equipment. However, the currently roll-type display devices available for intelligent terminals have a large curling radius and an overall volume of the display devices is relatively large, which is hard to realize a miniaturization design.

SUMMARY OF INVENTION

Embodiments of the present application provide a display device and a mobile terminal, to solve a problem that the current display device has a large curling radius and hard to realize a miniaturization design.

Embodiments of the present application provide a display device, including:
 a display screen including a first terminal and a second terminal which are disposed oppositely, wherein a display surface is connected between the first terminal and the second terminal;
 a reel connected to the first terminal of the display screen;
 a lifting assembly connected to the second terminal of the display screen, wherein the lifting assembly is positioned on a side of the display screen away from the display surface, and wherein the lifting assembly and the reel are configured to synchronously control the display screen to be expanded or to be rolled-up; and
 a control circuit board electrically connected to the display screen, wherein the control circuit board is positioned in the lifting assembly.

Optionally, in some embodiments of the present application, the lifting assembly includes a lifting portion and an installation portion which are connected to each other, wherein the lifting portion is configured to control lifting and lowering of the installation portion, wherein the installation portion is connected to the second terminal of the display screen, and wherein the control circuit board is positioned in the installation portion.

Optionally, in some embodiments of the present application, the lifting portion includes a plurality of hinges connected in sequence along a lifting direction of the lifting assembly, and wherein the hinges close to the installation portion are connected to the installation portion.

Optionally, in some embodiments of the present application, the display screen includes a display panel, a circuit board, and a connection line connected between the display panel and the circuit board, wherein the display panel is connected to the reel, wherein one terminal of the circuit board is electrically connected to the display panel through the connection line, and wherein another terminal of the circuit board is electrically connected to the control circuit board.

Optionally, in some embodiments of the present application, the circuit board is positioned in the lifting assembly.

Optionally, in some embodiments of the present application, the display screen further includes a support plate, wherein the support plate is attached to a backlight surface of the display panel, and wherein the reel is configured to expand or roll-up the display panel and the support plate.

Optionally, in some embodiments of the present application, the display device further includes a control power supply, wherein the control power supply is electrically connected to the control circuit board, and wherein the control power supply is positioned in the lifting assembly.

Optionally, in some embodiments of the present application, the display device further includes a driving assembly, wherein the driving assembly is connected to the lifting assembly and the reel, and wherein the driving assembly is configured to synchronously drive the lifting assembly lift and rotate the reel, to control the display screen expanding or rolling-up.

Optionally, in some embodiments of the present application, the driving assembly includes a first driving member and a second driving member which are driven synchronously, wherein the first driving member is positioned on one side of the reel, wherein the first driving member is connected to the lifting assembly to rise and fall the lifting assembly, wherein the second driving member is positioned in the reel, and wherein the second driving member is connected to the reel to rotate the reel.

Optionally, in some embodiments of the present application, the second driving member includes a motor and a transmission unit, wherein the motor is connected to the transmission unit, wherein the transmission unit is connected to the reel, and wherein the motor drives the transmission unit rotate to drive the reel rotate.

Optionally, in some embodiments of the present application, the transmission unit includes a coupling, a screw, and a vortex spring, wherein the coupling is connected to the motor, wherein the screw is connected between the coupling and the reel, and wherein the vortex spring is wound on the screw.

Optionally, in some embodiments of the present application, the display device further includes a housing, wherein the reel and the driving assembly are positioned in the housing, wherein the lifting assembly and the display screen are at least partially positioned in the housing, wherein the housing is provided with an opening configured to protrude the display screen from the housing when the display screen is expanded.

Correspondingly, one embodiment of the present application further provides a mobile terminal, where the mobile terminal includes a display device described in any one of the above-mentioned embodiments.

In the embodiment of the present application, the display device includes a display screen, a reel, a lifting assembly, and a control circuit board. The display screen includes a first terminal and a second terminal which are disposed oppositely, wherein a display surface is connected between the first terminal and the second terminal. The reel is connected to the first terminal of the display screen. The lifting assembly is connected to the second terminal of the display screen. The lifting assembly is positioned on a side of the display screen away from the display surface. The lifting assembly and the reel are configured to synchronously control the display screen to be expanded or to be rolled-up. The control circuit board is electrically connected to the display screen, wherein the control circuit board is positioned in the lifting assembly. In the present application, by arranging the control circuit board in the lifting assembly, the control circuit board will not affect a curling radius of the reel during a rolling-up process of the display screen, thereby the curling radius of the reel can be effectively reduced, to facilitate to realize a miniaturization design of the display device.

DESCRIPTION OF FIGURES

In order to illustrate the technical solutions in the embodiments of the present application more clearly, the following briefly introduces the figures that are used in the description of the embodiments. Obviously, the figures in the following description are only some embodiments of the present application. For those skilled in the art, other figures can also be obtained from these figures without inventive step.

DETAILED DESCRIPTION OF EMBODIMENTS

The technical solutions in the embodiments of the present application will be clearly and completely described below with reference to the figures in the embodiments of the present application. Obviously, the described embodiments are only a part of the embodiments of the present application, but not all of the embodiments. Based on the embodiments in the present application, all other embodiments obtained by those skilled in the art without inventive step fall within a protection scope of the present application. In addition, it should be understood that the specific embodiments described herein are only used to illustrate and explain the present application, but not to limit the present application. In the present application, unless otherwise stated, the directional words used such as "upper" and "lower" generally refer to the upper and lower sides of the device in actual use or working state, specifically a figure direction in the accompanying figures, while "inside" and "outside" refer to an outline of the device.

Embodiments of the present application provide a display device and a mobile terminal, which will be described in detail below. It should be noted that a description order of the following embodiments is not intended to limit a preferred order of the embodiments.

Figure 1:
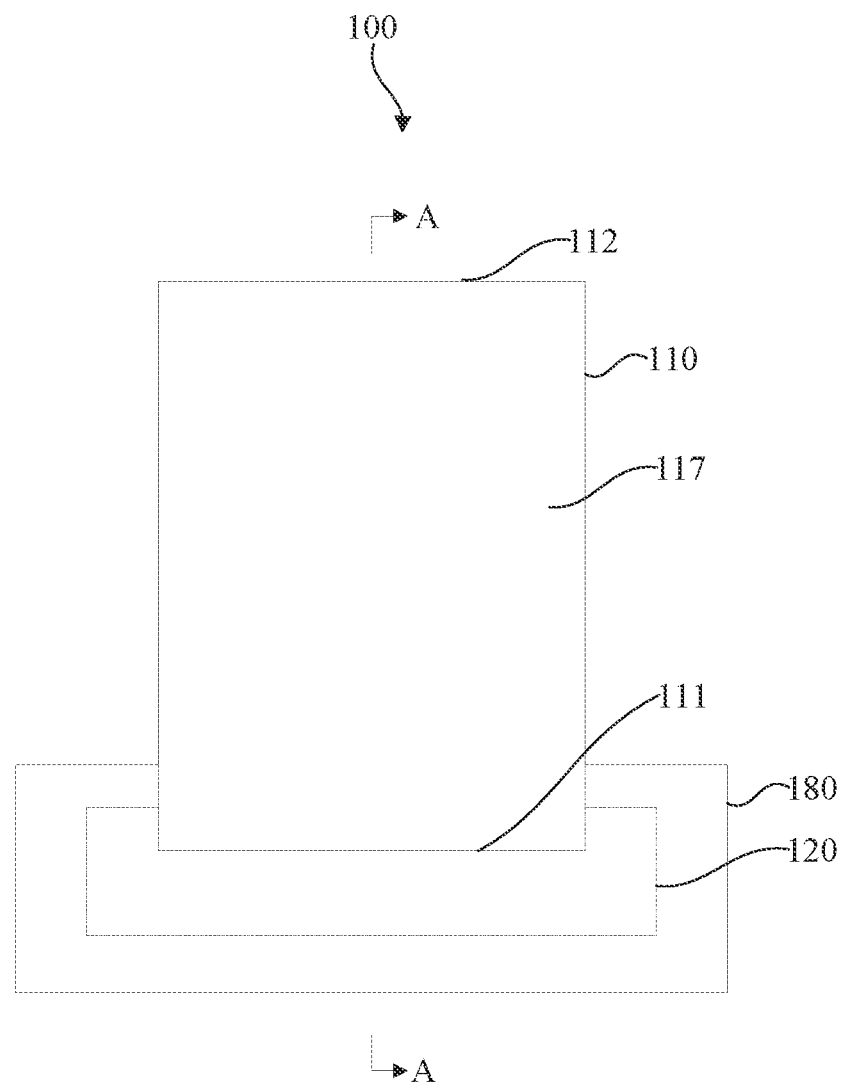
FIG. 1 is a schematic front view of a display device provided by one embodiment of the present application when the display device is expanded.
Figure 2:
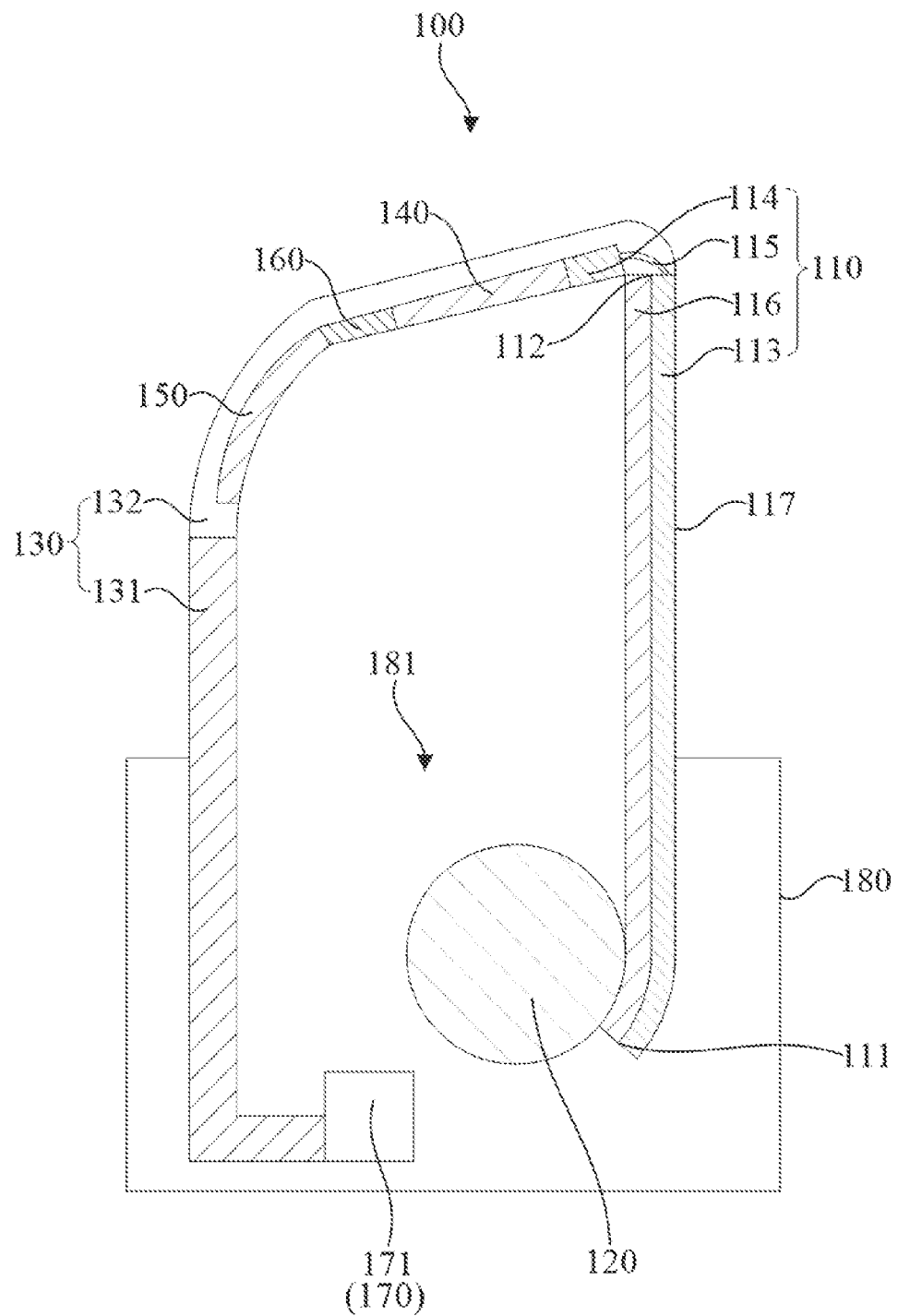
FIG. 2 is a cross-sectional view of a perspective A-A in FIG. 1 provided by one embodiment of the present application.
Figure 3:
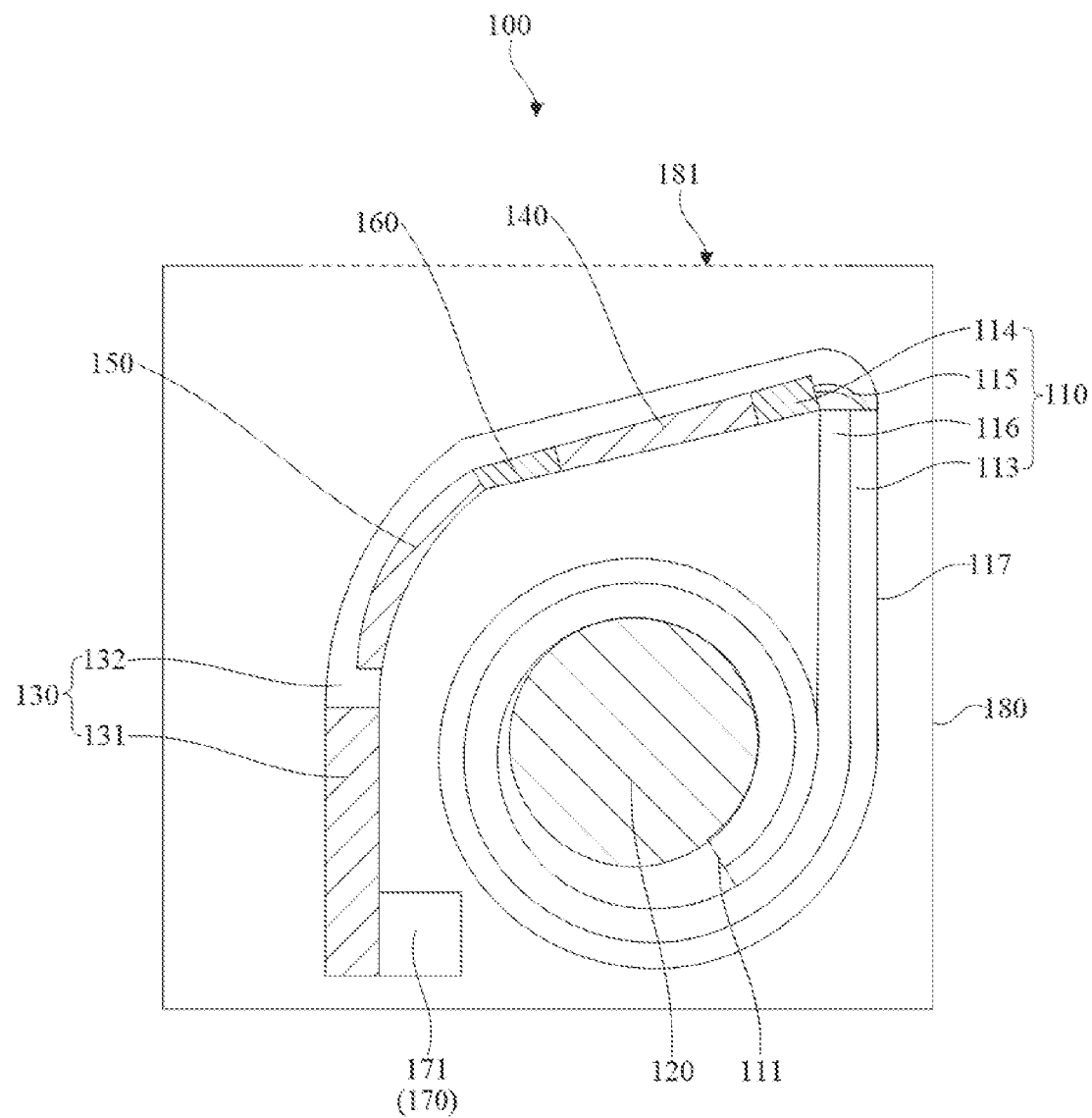
FIG. 3 is a schematic structural diagram of the display device provided by one embodiment of the present application shown in FIG. 2 when the display device is rolled up.

First, one embodiment of the present application provides a display device. As shown in FIGS. 1 to 3, the display device 100 includes a display screen 110. The display screen 110 is a main display structure of the display device 100, and a structural design of the display screen 110 directly affects an overall display effect of the display device 100. The display screen 110 is a flexible display structure. The display screen 110 includes a first terminal 111 and a second terminal 112 which are disposed oppositely and configured to connect with other structures, to facilitate expanding and rolling-up the display screen 110. The display screen 110 includes a display surface 117 connected between the first terminal 111 and the second terminal 112. The display surface 117 is a working surface of the display screen 110. The display surface 117 is mainly expanded and rolled up when the display screen 110 is expanded and rolled up, to realize the storage and use of the display device 100. Compared with a folding storage method, the display screen 110 adopts a method of expanding and rolling up, so that the display screen 110 has a larger display region when expanded, and has a smaller carrying volume after rolled up, thereby helping to realize a miniaturization design of the display device 100.

The display device 100 includes a reel 120. The reel 120 is connected to the first terminal 111 of the display screen 110. The reel 120 is configured to expand or roll-up the display screen 110. During a using process of the display device 100, the first terminal 111 of the display screen 110 can be directly attached to an outer surface of the reel 120, wherein the display screen 110 is wound around an axis of the reel 120 on the outer surface of the reel 120 when the reel 120 rotates in one direction, to realize a rolling up of the display screen 110. The display screen 110 can be gradually expanded from the reel 120 when the reel 120 rotates in another direction. The reel 120 stops rotation when the display screen 110 is expanded to a target position, wherein the reel 120 can play a role in fixing the display screen 110 at this time, to ensure a stable display of the display screen 110.

The display device 100 includes a lifting assembly 130. The lifting assembly 130 is connected to the second terminal 112 of the display screen 110. The lifting assembly 130 is positioned on a side of the display screen 110 away from the display surface 117. That is, the lifting assembly 130 is positioned on a back surface of the display screen 110, to prevent the lifting assembly 130 from interfering with the images displayed by the display screen 110 during a display process of the display screen 110, thereby ensuring a display effect of the display device 100.

The lifting assembly 130 and the reel 120 are configured to synchronously control the display screen 110 to be expanded or to be rolled-up. That is, the lifting assembly 130 and the reel 120 are respectively connected to opposite terminals of the display screen 110. The lifting assembly 130 can simultaneously stretch the second terminal 112 of the display screen 110 when the display screen 110 is expanded from the reel 120, so that the display screen 110 can be expanded from the reel 120 smoothly. The lifting assembly 130 is rolled up to the reel 120 when the display screen 110 is rolled up at the same time. A synchronous operation of the lifting assembly 130 and the reel 120 enables the display screen 110 to remain flat during an expanding process or a rolling-up process, thereby ensuring the display effect of the display screen 110. In addition, after the display screen 110 is expanded, the lifting assembly 130 can also support the display screen 110 to ensure a stability of the display screen 110 during the display process, thereby ensuring a stable use of the display device 100.

The display device 100 further includes a control circuit board 140. The control circuit board 140 is electrically connected to the display screen 110, and a control circuit is integrated on the control circuit board 140. By the design of the control circuit on the control circuit board 140 and the design of the connection mode of the control circuit board 140 and the display screen 110 can realize a regulation of the display mode of the display screen 110 to meet different display requirements of the display device 100.

The control circuit board 140 is positioned in the lifting assembly 130. That is, the control circuit board 140 is hidden and designed in the lifting assembly 130, so that when the display screen 110 is rolled up, the control circuit board 140 will not affect a curling radius of the reel 120. Compared with the currently control circuit board 140 placed inside the reel 120 or placed on the reel 120 and rolled together with the reel 120, the curling radius of the reel 120 can be effectively reduced, thereby helping to reduce an overall size of the display device 100, to realize the miniaturization design of the display device 100.

In one embodiment of the present application, the display device 100 includes a display screen 110, a reel 120, a lifting assembly 130, and a control circuit board 140. The reel 120 is connected to a first terminal 111 of the display screen 110. The lifting assembly 130 is connected to a second terminal 112 of the display screen 110. The lifting assembly 130 is positioned on a side of the display screen 110 away from the display surface 117. The lifting assembly 130 and the reel 120 are configured to synchronously control the display screen 110 to be expanded or to be rolled-up. The control circuit board 140 is electrically connected to the display screen 110, and the control circuit board 140 is positioned in the lifting assembly 130. In the present application, by arranging the control circuit board 140 in the lifting assembly 130, the control circuit board 140 will not affect a curling radius of the reel 120 during a rolling-up process of the display screen 110, thereby the curling radius of the reel 120 can be effectively reduced, to facilitate to realize a miniaturization design of the display device 100.

Optionally, the lifting assembly 130 includes a lifting portion 131 and an installation portion 132 which are connected to each other, wherein the lifting portion 131 can be lifted and lowered during the expanding process or the rolling-up process of the display screen 110, thereby controlling lifting and lowering of the installation portion 132. One terminal of the installation portion 132 is connected to the lifting portion 131, and another terminal is connected to the second terminal 112 of the display screen 110. The control circuit board 140 is positioned in the installation portion 132. That is, the installation portion 132 is configured to install the control circuit board 140 and the like which are circuit structures configured to control the display of the display screen 110, to realize a hidden design of the relevant circuit structure outside the display screen 110, which can prevent an increase of the curling radius of the reel 120 caused by directly winding the control circuit board 140 on the reel 120, and can reduce an intrusion of dust from the external environment.

It should be noted that the installation portion 132 can be designed as a hollow structure, and the control circuit board 140 can be pre-installed and fixed in the installation portion 132 and the connection terminals can be provided on the control circuit board 140 at the same time when manufacturing the lifting assembly 130. An electrical connection with the display screen 110 can be realized directly by using the connection terminals on the control circuit board 140 when the display screen 110 is connected to the lifting assembly 130. This structural design enables the display screen 110 to be directly separated from the control circuit board 140 when the display screen 110 fails, to facilitate a maintenance or a replacement of the display screen 110.

Optionally, the lifting portion 131 of the lifting assembly 130 includes a plurality of hinges connected in sequence along a lifting direction of the lifting assembly 130. The hinges close to the installation portion 132 are connected to the installation portion 132. The reel 120 rotates in a direction in which the display screen 110 is rolled out when the display screen 110 is expanded from the reel 120. At the same time, the plurality of hinges are gradually extended along the lifting direction of the lifting assembly 130, to provide a tensile force to the display screen 110, so that the display screen 110 is rolled out from the reel 120. The relative positions of the plurality of hinges are locked to realize a supporting effect of the display screen 110 and ensure a stable display of the display screen 110 when the display screen 110 is expanded to a target position. The reel 120 rotates in a direction in which the display screen 110 is rolled when the display screen 110 is rolled-up onto the reel 120, and simultaneously the plurality of hinges gradually retracted and folded along the lifting direction of the lifting assembly 130 until the display screen 110 is rolled up.

It should be noted that, in addition to using the plurality of hinges to connect the lifting portion 131 in sequence, the lifting portion 131 can also be composed of other structures with telescopic functions. For example, using a telescopic rod with a telescopic function, etc., it is only necessary to ensure that the lifting portion 131 can extend with the expanding of the display screen 110, retracting with the rolling-up of the display screen 110, and at the same time have a supporting function for the expanded display screen 110, which is not limited here.

Optionally, the display screen 110 includes a display panel 113, a circuit board 114, and a connection line 115 connected between the display panel 113 and the circuit board 114. The display panel 113 is connected to the reel 120. One terminal of the circuit board 114 is connected to the display panel 113 through the connection line 115. Another terminal of the circuit board 114 is electrically connected to the control circuit board 140. The circuit board 114 is electrically connected to the display panel 113 by the connection line 115, to realize a regulation of the display mode of the display panel 113, so that when connecting the display screen 110 and the control circuit board 140, only needs to directly electrically connect the control circuit board 140 to the circuit board 114 of the display screen 110. This structural design helps simplify the connection between the control circuit board 140 and the display screen 110, making the connection between the display screen 110 and the control circuit board 140 more flexible and convenient.

The connection line 115 may be a flexible flat cable (FFC) or a coaxial wire to ensure a stability of the connection between the circuit board 114 and the display panel 113 during the expanding process and the rolling-up process of the display screen 110.

In one embodiment of the present application, the circuit board 114 is positioned in the lifting assembly 130, that is, when the circuit board 114 is connected to the control circuit board 140, the circuit board 114 is extended into the lifting portion 131 of the lifting assembly 130. This design can reduce the intrusion of dust from the external environment into the circuit board 114, to avoid affecting a normal use of the circuit board 114, thereby improving a service life of the display screen 110. In addition, since the circuit board 114 is positioned in the lifting assembly 130, under a same condition, a distance between expanding and rolling up of the display screen 110 can also be reduced, thereby further reducing an overall volume of the display device 100, which is conducive to realize the miniaturization design of the display device 100.

Optionally, the display screen 110 further includes a support plate 116. The display panel 113 includes a display surface and a backlight surface. The support plate 116 is attached to the backlight surface of the display panel 113 to support the display panel 113. The reel 120 is configured to expand or roll-up the display panel 113 and the support plate 116. That is, the support plate 116 is attached to the backlight surface of the display panel 113 and then expanding or rolling-up at a same time as the display panel 113. During the expanding process of the display screen 110, the support plate 116 can support the display panel 113 to avoid problems such as warping of the display panel 113, thereby prevent the display effect of the display panel 113 is affected. In addition, the warping of the display panel 113 also easily causes an intrusion of dust from an external environment, which affects a service life of the display panel 113.

The support plate 116 is made of a flexible material similar to a memory steel sheet, so that the support plate 116 can be flexibly rolled and expanded simultaneously with the display panel 113, and can also support the display panel 113 to ensure a flatness of the display panel 113, thereby improving an overall display effect of the display device 100.

Optionally, the display device 100 further includes a control power supply 150. The control power supply 150 is electrically connected to the control circuit board 140, to realize conductions of the circuits on the control circuit board 140, to realize conductions of the circuits on the circuit board 114, thereby realizing an adjustment of a display mode of the display panel 113 to meet different display requirements of the display device 100.

The control power supply 150 is positioned in the lifting assembly 130. That is, the control power supply 150 is simultaneously disposed in the lifting portion 131 of the lifting assembly 130 when the lifting assembly 130 is manufactured to realize a hidden design of the control power supply 150 in the lifting assembly 130. Such the structural design can reduce an overall space ratio of the display device 100, and avoid the intrusion of dust and the like from the external environment, thereby improving a service life of the whole display device 100.

It should be noted that a wiring region 160 is also formed between the control power supply 150 and the control circuit board 140. The wiring region 160 is configured to form the connection line 115 between the control power supply 150 and the control circuit board 140, to facilitate a connection design between the control power supply 150 and the control circuit board 140, to make a connection between the control power supply 150 and the control circuit board 140 is more flexible and more convenient.

Optionally, the display device 100 further includes a driving assembly 170. The driving assembly 170 is connected to the lifting assembly 130 and the reel 120. The driving assembly 170 is configured to synchronously rise and fall the lifting assembly 130 and rotate the reel 120, to control the display screen 110 to be expanded or rolled-up. That is, the lifting and lowering of the lifting assembly 130 and the rotation of the reel 120 are both realized by a driving control of the driving assembly 170. By a structural design of the driving assembly 170 and an adjustment of the driving mode, the display screen 110 can be rolled out from the reel 120 and the lifting assembly 130 can be kept to be pulled up synchronously to lift the display screen 110, thereby ensuring a stable expanding of the display screen 110. At the same time, the retracting of the lifting assembly 130 can be synchronized with the rolling-up of the display screen 110 by the reel 120, thereby ensuring a stable retraction of the display screen 110.

The driving assembly 170 includes a first driving member 171. The first driving member 171 is positioned on one side of the reel 120, and the first driving member 171 is connected to the lifting assembly 130 to rise and fall the lifting assembly 130. That is, the first driving member 171 drives the lifting assembly 130 to be extended to provide a tensile force to the display screen 110 when the display screen 110 is expanded, the first driving member 171 drives the lifting assembly 130 to be rolled-up when the display screen 110 is retracted, so that a speed of retracting the first driving member 171 is synchronized with a speed of rolling-up the display screen 110 onto the reel 120.

Figure 4:
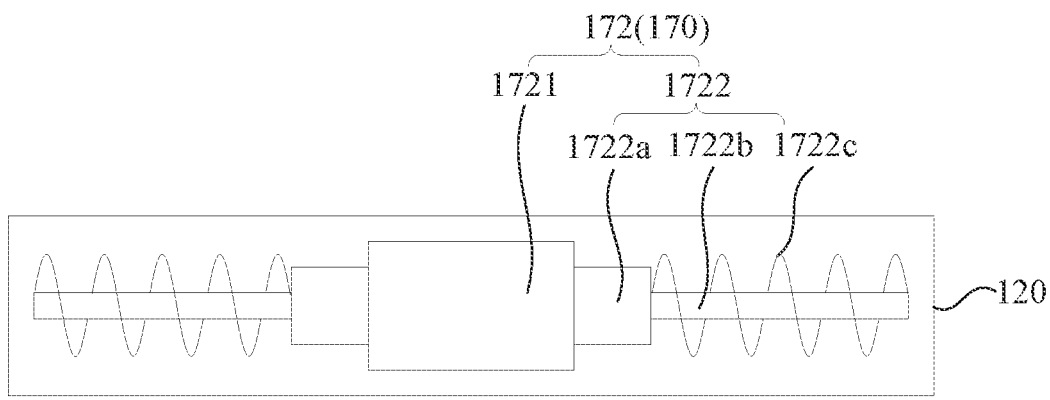
FIG. 4 is a schematic structural diagram of an interior of a reel provided by one embodiment of the present application.

As shown in FIG. 4, the driving assembly 170 further includes a second driving member 172. The second driving member 172 and the first driving member 171 are driven synchronously. The second driving member 172 is positioned in the reel 120, and the second driving member 172 is connected to the reel 120 to drive the reel 120 to be rotated. That is, the reel 120 has a hollow structure. By disposing the second driving member 172 inside the reel 120, an internal space of the reel 120 can be fully utilized without occupying an external space of the reel 120, thereby reducing an overall space ratio of the display device 100, which is conducive to further realizing the miniaturization design of the display device 100.

Optionally, the second driving member 172 includes a motor 1721 and a transmission unit 1722. The motor 1721 is connected to the transmission unit 1722. The transmission unit 1722 is connected to the reel 120. That is, a transmission connection is adopted between the motor 1721 and the reel 120. The motor 1721 drives the transmission unit 1722 rotates to drive the reel 120 to be rotated, wherein an arrangement of the transmission unit 1722 is beneficial to improve a stability of the rotation of the reel 120.

The transmission unit 1722 includes a coupling 1722a, a screw 1722b, and a vortex spring 1722c. The coupling 1722a is connected to the motor 1721. The screw 1722b is connected between the coupling 1722a and the reel 120. The vortex spring 1722c is wound on the screw 1722b. The motor 1721 drives the coupling 1722a to be rotated to drive the screw 1722b to be rotated, thereby driving the reel 120 to be rotated. For example, the display screen 110 is expanded outward when the motor 1721 rotates in a forward direction, and the display screen 110 is rolled inward when the motor 1721 is rotated in a reverse direction.

It should be noted that the disposing of the coupling 1722a can make the expanding and rolling-up of the display screen 110 more stable, and the step of expanding and rolling-up of the entire display screen 110 can be kept consistent. The vortex spring 1722c is wound on an outer wall of the screw 1722b, so that the vortex spring 1722c can be rotated along with the screw 1722b to have a pre-tightening force, thereby balancing a torque when the display screen 110 is expanded or rolled-up, so that the first driving member 171 can be operated in a low torque state. At the same time, the vortex spring 1722c can also ensure the display screen 110 is in a stable rolling state after being rolled-up.

Optionally, the display device 100 can also be provided with a limit assembly. The limit assembly is configured to limit a specific position of the display screen 110 during the expanding process or the rolling-up process. The limit assembly can be a limiter configured to limit fixation, such as an electromagnetic sensor, etc. The present application can also directly use a program to control the position of the display screen 110 during the expanding process or the rolling-up process, thereby different expanding requirements of the display screen 110 can be realized by adjusting and designing the program parameters, making a whole control process simple and convenient.

It should be noted that, since the first driving member 171 is mainly configured to drive and control the lifting and lowering of the lifting assembly 130, the second driving member 172 is mainly configured to drive and control the rotation of the reel 120, and the display screen 110 is connected to the lifting assembly 130 and the reel 120 at the same time, wherein the display screen 110 can be expanded or rolled up through a joint action of the lifting assembly 130 and the reel 120. Therefore, it is necessary to ensure a driving synchronization of the first driving member 171 and the second driving member 172 when designing a driving mode of the first driving member 171 and the second driving member 172, to ensure a stability of expanding or rolling-up steps of the display screen 110.

In one embodiment of the present application, the first driving member 171 and the second driving member 172 recognize a rotational speed of the motor with each other through a code disc, to realize synchronous expanding or rolling-up with the display screen 110. The limit assembly is an electromagnetic sensor, an induction signal will be sent out, and the motors of the first driving member 171 and the second driving member 172 will receive the induction signal when the second driving member 172 drives the reel 120 to rotate to a set position. After that, the rotation is stopped, to realize a limiting effect on an expanding position or a rolling-up position of the display screen 110.

Optionally, the display device 100 further includes a housing 180, wherein the reel 120 and the driving assembly 170 are installed in the housing 180. Since one terminal of the lifting assembly 130 is connected to the driving assembly 170 and one terminal of the display screen 110 is connected to the reel 120, during the expanding process or the rolling-up process of the display screen 110, the lifting assembly 130 and the display screen 110 are at least partially positioned in the housing 180.

The housing 180 is provided with an opening 181. The display screen 110 and the lifting assembly 130 are all positioned in the housing 180 when the display screen 110 is in a rolled-up state. The lifting assembly 130 and the display screen 110 protrudes out of the housing 180 through the opening 181 on the housing 180, and the lifting assembly 130 is positioned on a side of the display screen 110 away from the display surface 117. That is, the lifting assembly 130 is positioned on a back surface of the display screen 110 when the display screen 110 is in an expanded state, to realize a normal use of the display device 100.

It should be noted that, since the first terminal 111 of the display screen 110 is connected to the reel 120, the display screen 110 can be rolled onto the reel 120 or rolled out from the reel 120. If the first terminal 111 of the display screen 110 is directly attached to an outer surface of the reel 120, a part of the display screen 110 connected to the reel 120 is always positioned in the housing 180 when the display screen 110 is expanding, resulting in the display screen 110 cannot be effectively used, and under a condition of ensuring a same effective display region, it will lead to an increase in production costs. At the same time, it will also lead to an increase in the curling radius of the display screen 110 after being rolled, which in turn leads to an increase in an overall size of the display device 100, and is not conducive to the miniaturization of the display device 100.

In one embodiment of the present application, a transition portion can be provided between the second terminal 112 of the display screen 110 and the reel 120. The transition portion can be a flexible film, one terminal of the transition portion is connected to the second terminal 112 of the display screen 110, and another terminal of the transition portion is attached to the reel 120. The transition portion is wound on the reel 120, and the display screen 110 is wound on an outer surface of the transition portion when the display screen 110 is in the rolled-up state. Since the transition portion is connected between the reel 120 and the display screen 110, the display screen 110 can be completely rolled out from the reel 120 when the display screen 110 is in the expanded state, to maximize a utilization rate of the display screen 110.

It should be noted that a thickness of the transition portion is relative thinner to a thickness of the display screen 110, so that when the display screen 110 is rolled onto the reel 120, even if there is still a transition portion between the display screen 110 and the reel 120, the curl radius of the reel 120 would still not be greatly affected. In addition, in order to ensure the stability of the display screen 110 relative to the reel 120 when the display screen 110 is fully expanded, a number of rolling turns of the transition portion on the reel 120 can be appropriately increased to prevent a breakage formed between the display screen 110 and the reel 120 during using the display device 100, to prevent causing the display device 100 cannot to be used normally.

In an actual manufacturing process, a length of the transition portion can be adjusted according to an actual design and use requirements, which is only necessary to ensure that the setting of the transition portion can improve a utilization rate of the display screen 110 and ensure a stability of the display screen 110 relative to the reel 120 at the same time, which is not particularly limited here.

Secondly, one embodiment of the present application further provides a mobile terminal. The mobile terminal includes the display device in the above-mentioned embodiments. Since the mobile terminal provided in this embodiment adopts all the technical solutions of all the above-mentioned embodiments, it also has all the beneficial effects brought by the technical solutions of the above-mentioned embodiments, which will not be repeated here.

Figure 5:
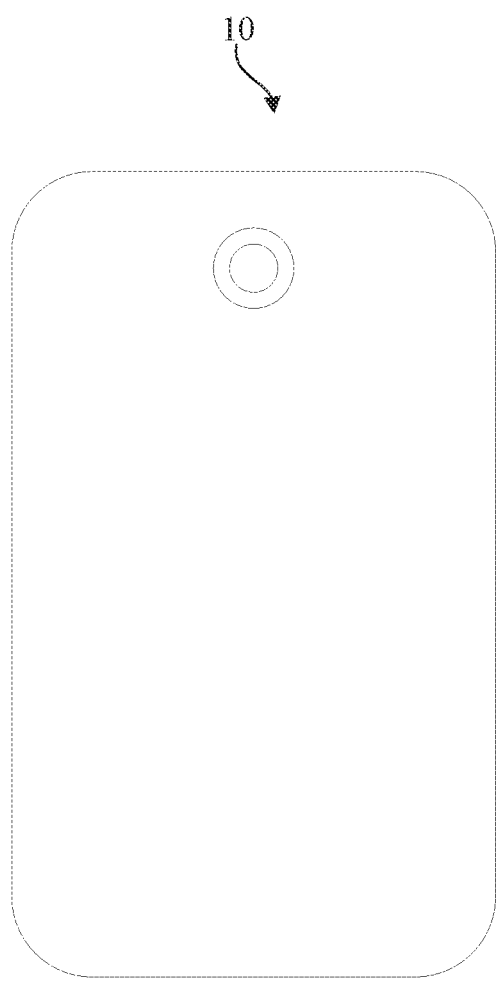
FIG. 5 is a schematic structural diagram of a mobile terminal provided by one embodiment of the present application.

FIG. 5 is a schematic structural diagram of the mobile terminal provided by one embodiment of the present application. In one embodiment of the present application, the mobile terminal 10 may further include one or more of functional components such as an antenna structure, a microphone, a speaker, a headphone interface, a universal serial bus interface, a camera, a distance sensor, an ambient light sensor, and a processor, so that the mobile terminal 10 can be adapted to various application fields. In one embodiment of the present application, the mobile terminal may be a mobile phone, a tablet computer, a notebook computer, an electronic reader, etc., which is not particularly limited here.

In one embodiment of the present application, the mobile terminal 10 includes a display device 100. The display device 100 includes a display screen 110, a reel 120, a lifting assembly 130, and a control circuit board 140. The reel 120 is connected to a first terminal 111 of the display screen 110. The lifting assembly 130 is connected to a second terminal 112 of the display screen 110. The lifting assembly 130 is positioned on a side of the display screen 110 away from the display surface 117. The lifting assembly 130 and the reel 120 are configured to synchronously control the display screen 110 to be expanded or to be rolled-up. The control circuit board 140 is electrically connected to the display screen 110, wherein the control circuit board 140 is positioned in the lifting assembly 130. In the present application, by arranging the control circuit board 140 in the lifting assembly 130, the control circuit board 140 will not affect a curling radius of the reel 120 during a rolling-up process of the display screen 110, thereby the curling radius of the reel 120 can be effectively reduced, to facilitate to realize a miniaturization design of the display device 100.

A display device and a mobile terminal provided by the embodiments of the present application have been introduced in detail above. The principles and implementations of the present application are described with specific examples. The descriptions of the above embodiments are only used to help understand the present application. At the same time, for those skilled in the art, according to the idea of the present application, there will be changes in the specific embodiments and an application scope. In summary, the content of this specification should not be construed as a limitation to the present application.

What is claimed is:

1. A display device, comprising:
   a display screen comprising a first terminal and a second terminal which are disposed oppositely, wherein a display surface is connected between the first terminal and the second terminal;
   a reel connected to the first terminal of the display screen;
   a lifting assembly connected to the second terminal of the display screen, wherein the lifting assembly is positioned on a side of the display screen away from the display surface, and wherein the lifting assembly and the reel are configured to synchronously control the display screen to be expanded or to be rolled-up; and
   a control circuit board electrically connected to the display screen, wherein the control circuit board is positioned in the lifting assembly;
   wherein a flexible film is provided between the second terminal and the reel, and the flexible film has an end connected to the second terminal and another end attached to the reel;
   wherein the flexible film is thinner than the display screen;
   wherein the lifting assembly comprises a lifting portion and an installation portion which are connected to each other, wherein the lifting portion is configured to control lifting and lowering of the installation portion, wherein the installation portion is connected to the second terminal of the display screen, and wherein the control circuit board is positioned in the installation portion;
   wherein the lifting portion has a telescopic structure extendable along a lifting direction of the lifting assembly, and wherein an end of the telescopic structure close to the installation portion is connected to the installation portion.

2. The display device according to claim 1, wherein the display screen comprises a display panel, a circuit board, and a connection line connected between the display panel and the circuit board, wherein the display panel is connected to the reel, wherein one terminal of the circuit board is electrically connected to the display panel through the connection line, and wherein another terminal of the circuit board is electrically connected to the control circuit board.

3. The display device according to claim 2, wherein the circuit board is positioned in the lifting assembly.

4. The display device according to claim 2, wherein the display screen further comprises a support plate, wherein the support plate is attached to a backlight surface of the display panel, and wherein the reel is configured to expand or roll-up the display panel and the support plate.

5. The display device according to claim 1, wherein the display device further comprises a control power supply, wherein the control power supply is electrically connected to the control circuit board, and wherein the control power supply is positioned in the lifting assembly.

6. The display device according to claim 1, wherein the display device further comprises a driving assembly, wherein the driving assembly is connected to the lifting assembly and the reel, and wherein the driving assembly is configured to synchronously drive the lifting assembly lift and rotate the reel, to control the display screen expanding or rolling-up.

7. The display device according to claim 6, wherein the driving assembly comprises a first driving member and a second driving member which are driven synchronously, wherein the first driving member is positioned on one side of the reel, wherein the first driving member is connected to the lifting assembly to rise and fall the lifting assembly, wherein the second driving member is positioned in the reel, and wherein the second driving member is connected to the reel to rotate the reel.

8. The display device according to claim 7, wherein the second driving member comprises a motor and a transmission unit, wherein the motor is connected to the transmission unit, wherein the transmission unit is connected to the reel, and wherein the motor is configured to drive the transmission unit to be rotated to drive the reel to be rotated.

9. The display device according to claim 8, wherein the transmission unit comprises a coupling, a screw, and a vortex spring, wherein the coupling is connected to the motor, wherein the screw is connected between the coupling and the reel, and wherein the vortex spring is wound on the screw.

10. The display device according to claim 6, wherein the display device further comprises a housing, wherein the reel and the driving assembly are positioned in the housing, wherein the lifting assembly and the display screen are at least partially positioned in the housing, wherein the housing is provided with an opening configured to protrude the display screen from the housing when the display screen is expanded.

11. A mobile terminal, wherein the mobile terminal comprises a display device, and wherein the display device comprises:

a display screen comprising a first terminal and a second terminal which are disposed oppositely, wherein a display surface is connected between the first terminal and the second terminal;

a reel connected to the first terminal of the display screen;

a lifting assembly connected to the second terminal of the display screen, wherein the lifting assembly is positioned on a side of the display screen away from the display surface, and wherein the lifting assembly and the reel are configured to synchronously control the display screen to be expanded or to be rolled-up; and a control circuit board electrically connected to the display screen, wherein the control circuit board is positioned in the lifting assembly;

wherein a flexible film is provided between the second terminal and the reel, and the flexible film has an end connected to the second terminal and another end attached to the reel;

wherein the flexible film is thinner than the display screen;

wherein the lifting assembly comprises a lifting portion and an installation portion which are connected to each other, wherein the lifting portion is configured to control lifting and lowering of the installation portion, wherein the installation portion is connected to the second terminal of the display screen, and wherein the control circuit board is positioned in the installation portion;

wherein the lifting portion has a telescopic structure extendable along a lifting direction of the lifting assembly, and wherein an end of the telescopic structure close to the installation portion is connected to the installation portion.

12. The mobile terminal according to claim 11, wherein the display screen comprises a display panel, a circuit board, and a connection line connected between the display panel and the circuit board, wherein the display panel is connected to the reel, wherein one terminal of the circuit board is electrically connected to the display panel through the connection line, and wherein another terminal of the circuit board is electrically connected to the control circuit board.

13. The mobile terminal according to claim 12, wherein the circuit board is positioned in the lifting assembly.

14. The mobile terminal according to claim 12, wherein the display screen further comprises a support plate, wherein the support plate is attached to a backlight surface of the display panel, and wherein the reel is configured to expand or roll-up the display panel and the support plate.

15. The mobile terminal according to claim 11, wherein the display device further comprises a control power supply, wherein the control power supply is electrically connected to the control circuit board, and wherein the control power supply is positioned in the lifting assembly.

16. The mobile terminal according to claim 11, wherein the display device further comprises a driving assembly, wherein the driving assembly is connected to the lifting assembly and the reel, and wherein the driving assembly is configured to synchronously drive the lifting assembly lift and rotate the reel, to control the display screen expanding or rolling-up.

* * * * *